T. ELLIOTT.
HAY-LOADER.

No. 183,288. Patented Oct. 17, 1876.

WITNESSES:
A. W. Almquist
John Goethals

INVENTOR:
T. Elliott
BY Munn
ATTORNEYS.

UNITED STATES PATENT OFFICE.

THOMAS ELLIOTT, OF PETERBOROUGH, ONTARIO, CANADA.

IMPROVEMENT IN HAY-LOADERS.

Specification forming part of Letters Patent No. 183,288, dated October 17, 1876; application filed March 13, 1876.

*To all whom it may concern:*

Figure 1:
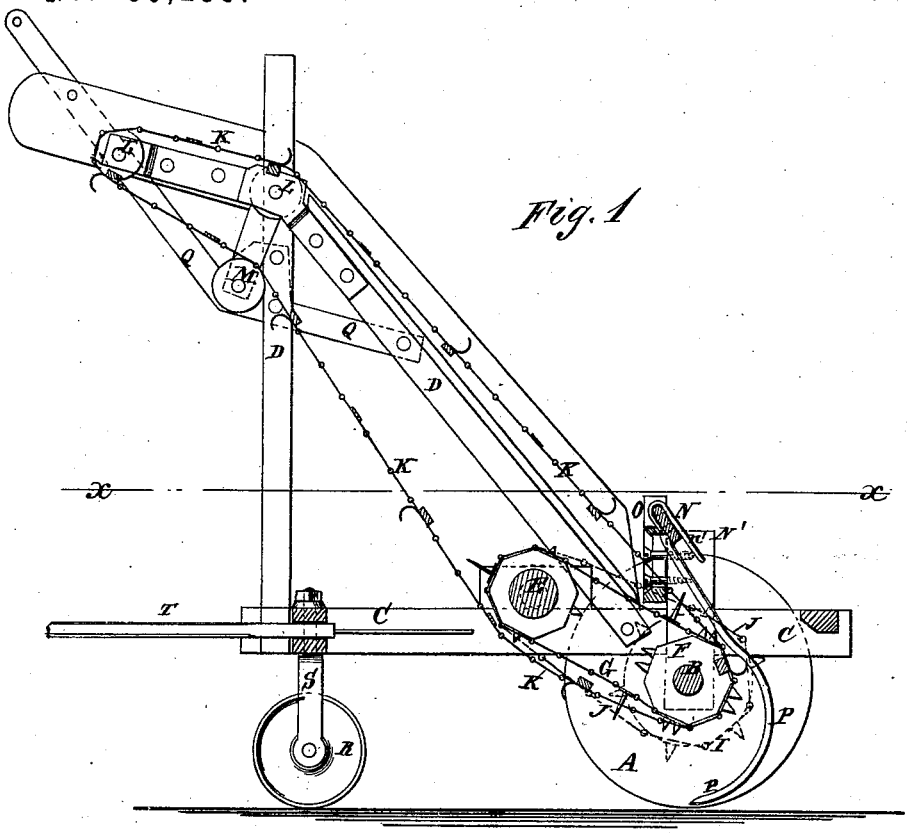
Figure 2:
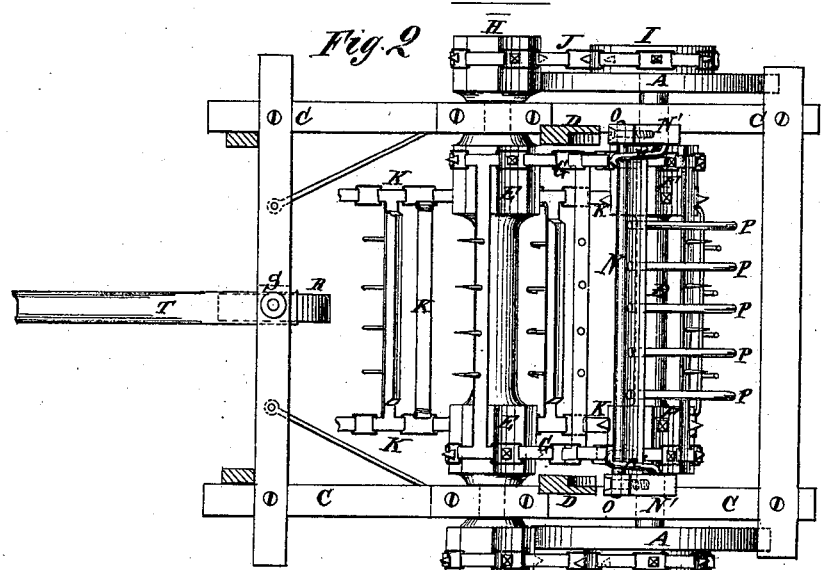

Be it known that I, THOMAS ELLIOTT, of Peterborough, in the county of Peterborough, Province of Ontario, and Dominion of Canada, have invented a new and useful Improvement in Hay Rake and Loader, of which the following is a specification:

Figure 1 is a vertical section of my improved machine. Fig. 2 is a top view of the same, partly in horizontal section, through the line $x\,x$, Fig. 1.

Similar letters of reference indicate corresponding parts.

The object of this invention is to furnish an improved machine for gathering hay and loading it upon a wagon, and which shall be simple in construction, effective in operation, strong, durable in use, and not liable to get out of order.

The invention will first be fully described in connection with drawing, and then pointed out in the claim.

A are the wheels, which are attached to the axle B. C is the base-frame of the machine, the rear part of which rides upon the axle B, and to the middle parts of the side bars of which are attached bearings for a shaft, having two spur-wheels, E, attached to it upon the inner sides, and two, H, upon the outer sides of said side bars. To the end of the axle B, or to the wheels A, are attached spur-wheels I, around which pass endless chains J, which also pass around spur-wheels H, to give motion to the said spur-wheels H, and to the spur-wheels E, attached to the same shaft. Around the spur-wheels E pass the endless chains of the short carrier G, which passes around the spur-wheels F, which revolve upon the axle B at the inner sides of the side bars of the frame C. To the cross-bars of the carrier G are attached straight teeth, as shown in Fig. 1. The spur-wheels F are made wide, so that they may have a second set of spurs to receive the endless chains of the long carrier K, and give motion to said carrier. To the cross-bars of the carrier K are attached hook-teeth, as shown in Fig. 1.

The endless chains of the long carrier K pass up along guide flanges or cleats attached to the inclined bars of the frame D, pass over and around the guide-pulleys L L, pivoted to the said frame D. The endless chains of the carrier in their return pass over the guide-pulleys M, pivoted to the frame D, or to arms attached to said frame to carry the carrier outward, so that it will not pull the loaded hay off the wagon. P are the curved wire teeth by which the hay is collected, and the upper ends of which are attached to the cross-bar or head N. The ends of the rake-head N are rounded off, and enter holes in the bars O, where the said head or bar is held in place when adjusted by wires or rods $n'$, the lower ends of which are attached to the posts $N'$, and their upper ends are hooked over the bar or head N. The bars O are slotted longitudinally to receive the bolts by which they are secured to the posts $N'$, so that the rake-teeth P may be conveniently adjusted closer to or farther from the ground, as desired. The lower ends of the posts N are securely attached to the side bars of the frame C. The upper part of the frame D is strengthened by braces Q attached to it.

The forward end of the machine is supported by a caster-wheel, R, the shank S of which is pivoted to the forward end of the frame C. To the shank S of the caster-wheel R is attached the tongue T, by which the machine is drawn, and which is designed to be connected with the rear axle of the wagon upon which the hay is to be loaded.

Having thus described my invention, I claim as new, and desire to secure by Letters Patent—

The combination of the adjustable bars O, the hook-bars $n'$, and the posts N, with the frame C, and the rake N P, substantially as herein shown and described.

THOMAS ELLIOTT.

Witnesses:
 CHAS. MCVITTIE,
 GEO. EDMISON.